W. BUTCHER, Jr., & T. SHAW.
Making Shot.
No. 65,339.
Patented June 4, 1867.
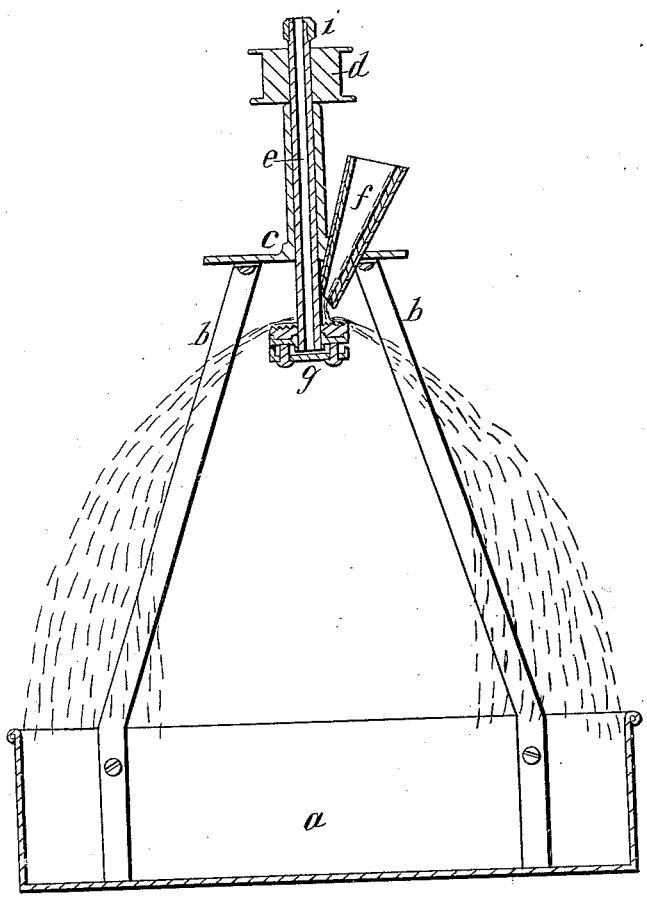

United States Patent Office.

WILLIAM BUTCHER, JR., OF SHEFFIELD, ENGLAND, AND THOMAS SHAW, OF PHILADELPHIA, PENNSYLVANIA.

*Letters Patent No. 65,339, dated June 4, 1867.*

---

IMPROVED MACHINE FOR "SHOTING" METALS.

---

*The Schedule referred to in these Letters Patent and making part of the same.*

---

TO ALL WHOM IT MAY CONCERN:

Be it known that we, WILLIAM BUTCHER, Jr., of Sheffield, England, and THOMAS SHAW, of the city and county of Philadelphia, Pennsylvania, have invented a new and improved Mode of Shoting Metals; and we hereby declare the following to be a full, clear, and exact description of the same, reference being had to the accompanying drawing, and to the letters of reference marked thereon.

Our invention consists in the employment of a rotating disk, in combination with a configurature of surface, arrangement of water passages, &c., all for the purpose as hereafter described.

In order to enable others to use and practise our invention, we will proceed to describe its construction and mode of operation.

On reference to the accompanying drawing, which forms a part of the specification, the sketch represents a vertical section through the centre of apparatus, of which $a$ is a tank for holding water, metal, &c., as hereafter described. $b\ b$, metal supports leading from same to disk-journal $c$, to which said strips are united by means of screws, for the purpose as hereafter described. $e$, a vertical shaft, which revolves in journal of disk $c$, secured to the top of which is band-wheel $d$. The centre of said shaft $e$ is bored out to form a tube from the top $i$ (where it is provided with a packed joint, $i$,) to the bottom, where it is united to a cast-iron disk, $g$, formed of two disks, and united by screws, the intervening space being used as a water passage from the centre of shaft to the periphery of disk, for the purpose as hereafter described. The top side of said disk $g$ is covered with burnt loam, soap-stone, or other convenient substance that will resist heat. Said substance is grooved on the surface of a volute configurature, or may be grooved in a number of radiating recesses for the purpose of leading molten metal to periphery of disk $g$ when said disk is revolved, as hereafter described. $f$ is a funnel, constructed of material to resist heat. Said funnel is for the purpose of leading metal from crucible to rotating disk $g$, all for the purpose as hereafter described. It is intended that disk-journal $c$ be placed on the floor of a room or tower, and tank $a$ in the cellar, when supports $b\ b$ will be found unnecessary. It is also intended that a draught of air be blown down funnel $f$ upon disk $g$ to keep heat from operator.

The object of this machine is to enable the shoting of metals requiring a high temperature to melt, and is operated in this wise: The shaft is rotated by means of belt running over pulley $d$, said belt communicating with a rotating shaft which shall cause disk $g$ to rotate five hundred or one thousand revolutions per minute. Water is allowed to pass through said shaft $e$ and disk $g$ by leading a pipe from a tank containing the same, and making a packed joint at top of said shaft $e$. The water passes through said shaft, and out of periphery of said disk, keeping the whole from being injuriously heated when white-hot metal is poured on top of said disk $g$, all for the purpose as hereafter described.

It will be observed that when said machine is rotated in the manner described, and molten metal is poured upon said disk through said funnel, the metal will be thrown off the periphery of said rotating disk in the form of spray, more or less fine, in proportion to speed of disk and quantity of metal poured upon the same. Said particles of metal will fall into the tank of water beneath, and be cooled after being changed and shaped in the air. In the mean time water is passing through said shaft and disk, and the spray and steam from the same assist in cooling metal.

It will be evident that modifications can be made in this apparatus without any alterations in the result. We therefore do not wish to confine ourselves to the exact shape and position of herein-described apparatus; but what we do claim, and desire to secure by Letters Patent, is—

1. The employment of a rotating disk for the purpose of throwing molten metal off in particles, as set forth.
2. The employment of configurated heat-enduring substances, for the purpose described.
3. The introduction of water passages, substantially as and for the purpose set forth.

WM. BUTCHER, JR. [L. S.]
THOMAS SHAW. [L. S.]

Witnesses:
ROBERT HUTCHINSON,
ELIAS J. SHAW.